United States Patent [19]

Levy

[11] Patent Number: 4,869,952

[45] Date of Patent: Sep. 26, 1989

[54] WATERPROOF SHELTER FABRIC

[76] Inventor: Harry Levy, 219-04 Stewart Rd., Hollis Hills, N.Y. 11427

[21] Appl. No.: 262,704

[22] Filed: Oct. 26, 1988

Related U.S. Application Data

[63] Continuation-in-part of Ser. No. 26,854, Mar. 17, 1987, abandoned.

[51] Int. Cl.$^4$ .............................................. B32B 7/00
[52] U.S. Cl. ................... 428/252; 428/253; 428/423.3; 428/423.5; 428/475.5; 428/919
[58] Field of Search ................ 428/252, 253, 423.3, 428/423.5, 475.5, 919

[56] References Cited

U.S. PATENT DOCUMENTS 4,539,255  9/1985  Sato et al. ..................... 428/423.3
4,656,080  4/1987  Takahashi et al. ................. 428/252

Primary Examiner—Marion C. McCamish
Attorney, Agent, or Firm—Charles I. Brodsky

[57] ABSTRACT

The waterproof shelter fabric of the invention is a 3-layer fabric, incorporating a first layer of lightweight fabric material, a second layer of polyurethane film and a third layer of Nylon tricot fabric material. Both the first and second layers, and the second and third layers, are laminated together, and the outside surface of the first layer is treated with an available water repellant to an extent consistent with the degree of waterproof protection desired.

8 Claims, 1 Drawing Sheet

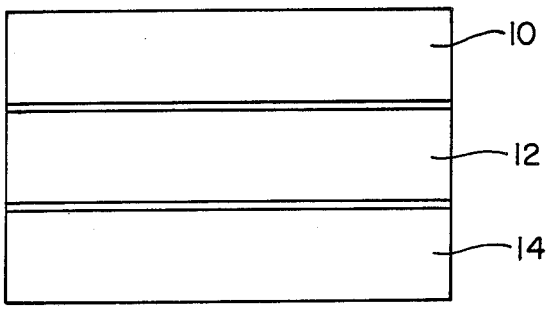

WATERPROOF SHELTER FABRIC

This is a continuation-in-part of application Ser. No. 07/026,854 filed by me on Mar. 17, 1987, now abandoned.

FIELD OF THE INVENTION

This invention relates to waterproof fabrics, in general, and to light-weight water repellant materials for ecotat shelters in military applications, in particular.

BACKGROUND OF THE INVENTION

As is well known and understood, ecotat shelter for military applications are typically transported about by the serviceman until field usage. As is similarly well known, the most desirable fabrics to be used in the manufacture of such shelters should exhibit the characteristics of being as light-weight as possible, while still maintaining the best possible integrity against water and wind. Optimally, the fabrics should be able to withstand washing and drycleaning, while at the same time affording a degree of breathability to the inhabitant once the shelter is erected (as a tent, or otherwise) by the serviceman on duty. It is a familiar sight to any movie-goer to see the stereotypical dog-faced soldier sitting in his tent in a battlefield situation, with water dripping down his nose while trying to endure the onslaught of a driving rainstorm, waiting for the weather to clear in order to attempt the taking of a strategic hill in battle.

As will be appreciated by those skilled in the art, the fabric most commonly used in the manufacture of ecotat shelters today is a poncho-type material, coated with one of a plurality of resins. Although providing adequate use during normal weather conditions, such constructions have proven to be burdensome to carry (because of their relatively heavy weight), and not as waterproof as the end-user would have preferred. Thus, in accordance with the use of such materials as a constructional background, it is an object of the present invention to provide a lightweight, very waterproof fabric to be used by a government in shelter constructions for military applicants -- but it is also an object of the invention to provide such a fabric for use in non-military shelter constructions, as well.

DESCRIPTION OF THE INVENTION

In accordance with the present invention, a 3-layer fabric (the drawing) is described which offers the features of being completely water and wind resistant, washable and drycleanable, and quite breathable. The first layer (shown by the reference numeral 10 in the accompanying drawing for purposes of understanding) is selected of a lightweight fabric material -- which, in military applications of ecotat shelters may comprise a typical Nylon camouflage fabric, with a "woodland" pattern and having a general weight of 2.8±0.2 ounces per square yard. As will be appreciated, while such fabric finds much governmental use in the military, it will also be appreciated that its use in the construction of ecotat shelters has never been suggested. Such fabric, moreover, is generally woven with a minimum of 101 ends per inch, and 63 two-ply textured picks per inch, which is consistent with many lightweight fabrics, in general.

Also shown in the drawings by the reference numerals 12 and 14 respectively, are the second and third layers of the fabric of the invention, a polyurethane film of weight typically 1.06±0.2 ounces per square yard, and a Nylon tricot fabric material of typical weight 1.5±0.3 ounces per square yard, in that order. In a preferred embodiment of the invention using such materials, the polyurethan film layer 12 was selected of 1.25 mil thickness, while the Nylon tricot fabric layer was selected of an olive green 106 color so as to blend in with the Nylon camouflage fabric when employed in a shelter construction. The overall appearance is thus that of an inner polyurethane layer sandwiched between outer layers of fabric material.

In the preferred embodiment of the invention, a completed construction was finalized by laminating the layers 10 and 12 together, and laminating the layers 12 and 14 together, using an adhesive mixture formed of the composition:

(1) polyurethane adhesive of viscosity 6,000 cps ±2,000 cps -- 39.2% by weight (2) polyurethane adhesive of viscosity 27,000 cps ±2,500 cps -- 39.2% by weight (3) polyurethane adhesive of viscosity 8,000 cps ±2,000 cps -- 9.8% by weight (4) polyurethane adhesive of viscosity 5,000 cps ±2,000 cps -- 11.8% by weight Such polyurethane adhesives are generally available, and manufactures by Soluol Chemical Company, Warwick, Rhode Island, under the Tradenames Solubond 1177, Solubond 1173, Solubond 1168, and Solubond 1101, respectively. Any appropriate lamination technique may be employed in this manufacture, with or without curing. In one method of manufacturing the fabric of the invention, the layers 10 and 12 were first laminated together, allowed to sit, and then laminated to the third layer 14.

Once so constructed, the 3-layer fabric of the invention is then exposed to any appropriate water-repellant treatment on the face, or exposed, side of the layer 10 -- for example, with a treatment of an emulsified fluorocarbon mixed with a non-flurinated extender and a reactant resin catalyst to enhance durability. One particularly attractive treatment of this type employed an emulsified fluorocarbon, a non-fluorinated extender and a reactant resin in proportions of 12%, 12% and 1%, respectively. One emulsified fluorocarbon employed was manufactured by the Dupont Chemical Company of Wilmington, Delaware under the Tradename Zepel, while the fluorinated extender could be that same Company's product sold under the Tradename Nalan W. With this construction of the invention, the water-repellant chemical mixture could be deposited on the exposed side of the layer 10 over a range of 1.5% to 4% by weight of the fabric employed, and give the results desired.

The resulting fabric composition has been found, through testing, to exhibit very many desirable advantages for its use as a shelter fabric. Firstly, it has been found to be 100% waterproof, and with its weight being of the order of 6 ounces per square yard, is very light weight. The fabric has been tested to have a very high tensile strength, and a breaking strength of over 150 pounds. Additionally, it has been tested to be quite washable and dry-cleanable, to the extent that it can withstand up to ten machine washings without any de-lamination of the layers, even in the presence of organic liquids employed in the cleansing process. The fabric has been determined to exhibit a hydrostatic resistance of over 100 PSI, yet exhibit a very soft stiffness, of under 12 PSI. The breathability afforded also provided the advantage of enabling the serviceman to sit within under temperatures of stifling heat, with the test shelter so formulated continuing to offer a high degree of breathability.

Whereas the invention has been particularly described in the context of a fabric for ecotat shelters in military applications, it will be appreciated by those skilled in the art that equal advantages would follow from using any available lightweight fabric as the exterior layer to be coated with the water repellant treatment. As will be understood, advantages will similarly flow for non-military shelter constructions simply through the expedient of employing a breathable, lightweight fabric as long as it offers the characteristics of washability, high tensile strength, and softness of composition. For at least such reason, therefore, resort should be had to the claims appended hereto for a true understanding of the scope of the invention.

I claim:

1. A waterproof shelter fabric comprising:
   a first layer of lightweight, washable, high tensile strength fabric material;
   a second layer of polyurethane film;
   a third layer of Nylon tricot fabric material;
   and a pair of adhesive laminations joining said first and second, and said second and third layers together, respectively;
   thereby presenting the appearance of an inner polyurethane layer sandwiched between outer layers of fabric material; and
   wherein said pair of adhesive laminations include adhesive mixtures composed of the formulation of weight of:
   polyurethane adhesive of viscosity 6,000 cps ±2,000 cps -- 39.2%;
   polyurethane adhesive of viscosity 27,000 cps ±2,500 cps -- 39.2%;
   polyurethane adhesive of viscosity 8,000 cps ±2,000 cps -- 9.8%;
   and polyurethane adhesive of viscosity 5,000 cps ±2,000 cps -- 11.8%.

2. The shelter fabric of claim 1 wherein there is also included a water repellant coating on a side of said first fabric layer remote from that adhesive lamination joining said first and second fabric layers together.

3. The shelter fabric of claim 1 wherein said first fabric layer is of a cloth material woven with a minimum of 101 ends per inch.

4. The shelter fabric of claim 1 wherein said first fabric layer is of a cloth material woven with a minimum of 63 two-ply textured picks per inch.

5. The shelter fabric of claim 1 in which said first fabric layer is formed of a Nylon camouflage material.

6. A waterproof shelter fabric, comprising:
   a first layer of Nylon camouflage fabric material having a weight of the order of 2.8±0.2 ounces per square yard;
   a second layer of polyurethane film having a weight of the order of 1.06±0.2 ounces per square yard;
   a third layer of Nylon tricot fabric material having a weight of the order of 1.5±0.3 ounces per square yard;
   a pair of adhesive laminations joining said first and second, and said second and third layers together, respectively;
   and a water repellant coating on a side of said first layer remote from that adhesive lamination joining said first and second layers together;
   thereby presenting the appearance of an inner polyurethane layer sandwiched between outer layers of fabric material; and
   wherein said water repellant coating includes an emulsified fluorocarbon mixed with a non-fluorinated extender and a reactant resin catalyst.

7. The shelter fabric of claim 6 wherein said emulsified fluorocarbon, said non-fluorinated extender and said reactant resin catalyst are mixed in proportions of 12%, 12% and 1%, respectively.

8. A waterproof shelter fabric, comprising:
   a first layer of Nylon camouflage fabric material having a weight of the order of 2.8±0.2 ounces per square yard;
   a second layer of polyurethane film having a weight of the order of 1.06±0.2 ounces per square yard;
   a third layer of Nylon tricot fabric material having a weight of the order of 1.5±0.3 ounces per square yard;
   a pair of adhesive laminations joining said first and second, and said second and third, layers together, respectively;
   and a water repellant coating on a side of said first layer remote from that adhesive lamination joining said first and second layers together;
   thereby presenting the appearance of an inner polyurethane layer sandwiched between outer layers of fabric material;
   wherein said pair of adhesive laminations include adhesive mixtures composed of the formulation by weight of:
   polyurethane adhesive of viscosity 6,000 cps ±2,000 cps -- 39.2%;
   polyurethane adhesive of viscosity 27,000 cps ±2,500 cps -- 39.2%;
   polyurethane adhesive of viscosity 8,000 cps ±2,000 cps -- 9.8%;
   and polyurethane adhesive of viscosity 5,000±2,000 cps -- 11.8%;
   and wherein said water repellant coating includes an emulsified fluorocarbon mixed with a non-fluorinated extender and a reactant resin catalyst.

* * * * *